(12) United States Patent
Sakaue et al.

(10) Patent No.: US 8,519,583 B2
(45) Date of Patent: Aug. 27, 2013

(54) ROTARY ELECTRIC MACHINE

(75) Inventors: Atsushi Sakaue, Tokyo (JP); Hiroyuki Akita, Tokyo (JP); Takumi Nakaue, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 331 days.

(21) Appl. No.: 12/992,722

(22) PCT Filed: May 16, 2008

(86) PCT No.: PCT/JP2008/059049
§ 371 (c)(1),
(2), (4) Date: Nov. 15, 2010

(87) PCT Pub. No.: WO2009/139067
PCT Pub. Date: Nov. 19, 2009

(65) Prior Publication Data
US 2011/0068647 A1    Mar. 24, 2011

(51) Int. Cl.
*H02K 3/50* (2006.01)
*H02K 3/18* (2006.01)
*H02K 3/28* (2006.01)

(52) U.S. Cl.
USPC ............................................. 310/71; 310/184

(58) Field of Classification Search
USPC .......................................................... 310/71
See application file for complete search history.

(56) References Cited

U.S. PATENT DOCUMENTS

| | | | | |
|---|---|---|---|---|
| 4,752,707 A | * | 6/1988 | Morrill | 310/184 |
| 6,359,361 B1 | * | 3/2002 | Wakui et al. | 310/179 |
| 7,135,799 B2 | * | 11/2006 | Rittmeyer | 310/180 |
| 7,936,099 B2 | * | 5/2011 | Staudemann et al. | 310/71 |
| 2002/0113517 A1 | | 8/2002 | Takano | |

FOREIGN PATENT DOCUMENTS

| | | |
|---|---|---|
| JP | 07-059283 A | 3/1995 |
| JP | 9-037494 A | 2/1997 |
| JP | 11-069671 A | 3/1999 |
| JP | 2001-275291 A | 10/2001 |
| JP | 2002-044891 A | 2/2002 |
| JP | 2002-153003 | 5/2002 |

(Continued)

OTHER PUBLICATIONS

Office Action (Notice of Reasons for Rejection) dated Jun. 12, 2012, issued by the Japanese Patent Office in the corresponding Japanese Patent Application No. 2010-511827 and an English translation of Office Action. (7 pages).

(Continued)

*Primary Examiner* — Burton Mullins
(74) *Attorney, Agent, or Firm* — Buchanan Ingersoll & Rooney PC

(57) ABSTRACT

It is necessary to secure a workspace for connection between jumper wires and a wire connecting material.

A rotary electric machine includes a plurality of magnetic teeth and a wire connecting material for wire connection. The rotary electric machine further includes a plurality of jumper sections, which are portions of one conductive wire continuously wound around the magnetic teeth and continuously connect coils formed of the conductive wire wound around the magnetic teeth. The jumper section includes first jumper sections which each are not connected by the wire connecting material with another jumper section, and second jumper sections which each are connected by the wire connecting material with another jumper section. Each first jumper section and each second jumper section are configured differently in shape and position from each other.

20 Claims, 12 Drawing Sheets

(56) References Cited

FOREIGN PATENT DOCUMENTS

| | | |
|---|---|---|
| JP | 2002-247792 A | 8/2002 |
| JP | 2002-325385 A | 11/2002 |
| JP | 2003-189525 A | 7/2003 |
| JP | 2004-064933 A | 2/2004 |
| JP | 2006-191757 A | 7/2006 |
| JP | 2006-288123 A | 10/2006 |
| JP | 2006-296146 A | 10/2006 |

OTHER PUBLICATIONS

International Search Report (PCT/ISA/210) issued on Aug. 19, 2008, by Japanese Patent Office as the International Searching Authority for International Application No. PCT/JP2008/059049.

Office Action dated Dec. 24, 2012 issued by the Chinese Patent Office in corresponding Chinese Patent Application No. 200880129244.2, and a partial English translation thereof.

\* cited by examiner

ROTARY ELECTRIC MACHINE

TECHNICAL FIELD

The present invention relates to a rotary electric machine, and is particularly suitable to an electric power steering device or the like which assists or drives a steering mechanism.

BACKGROUND ART

For intensive winding around magnetic teeth, a technique of winding a conductive wire to form coils successively is disclosed in FIGS. 5 and 6 of Patent Document 1.

Further, FIG. 3 of Patent Document 2 discloses a motor including jumper sections 13 having a single shape.

[Patent Document 1] Japanese Laid-Open Patent Publication No. 2006-191757

[Patent Document 2] Japanese Laid-Open Patent Publication No. 2002-153003

DISCLOSURE OF THE INVENTION

Problems to be Solved by the Invention

In the case where wire connections are performed as shown in FIGS. 5 and 6 of Patent Document 1, a plurality of jumper wires need to be connected by using a wire connecting material such as a wire connection board or a bus bar. As to the wire connection using the wire connecting material, Patent Document 1 merely discloses a wire connection diagram and a wire connection specification diagram as shown in FIGS. 5 and 6, and does not specifically suggest improvement in the configuration of connection points in jumper wires connected to a wire connecting material.

However, in order to actually wind a conductive wire having a predetermined diameter around a stator, and to connect jumper wires and a wire connecting material, a grip tool or a heat inputting tool is used for connection between the jumper wires and the wire connecting material. Accordingly, a problem is posed that a workspace for connecting both needs to be secured.

Further, Patent Document 2 discloses configurations of how conductive wires as jumper sections are gripped. However, all the jumper sections 13 in the motor disclosed in Patent Document 2 have a single shape. The configuration of jumper sections in the following case is not disclosed therein, that is, the case where a motor includes both jumper sections that are connected to one another by a wire connecting material, and jumper sections that are not connected.

The present invention is made in view of the above-described circumstances, and is intended to provide a rotary electric machine that is capable of securing a workspace necessary for wire connection.

Solution to the Problems

A rotary electric machine according to the present invention includes a plurality of magnetic teeth, and a wire connecting material used for wire connection. The rotary electric machine also includes a plurality of jumper sections which each are a portion of a conductive wire continuously wound around the plurality of magnetic teeth, and which each continuously connect coils that are formed of the conductive wire having been wound around the magnetic teeth. The plurality of jumper sections are divided into two types: first jumper sections that each are not connected to another jumper section by the wire connecting material; and second jumper sections that each are connected to another jumper section by the wire connecting material. The first jumper sections and the second jumper sections are configured to be different in shape and position from each other.

Effect of the Invention

According to this embodiment, it is possible to provide a rotary electric machine which is capable of securing a workspace for connection, among rotary electric machines of a type in which a plurality of jumper wires are connected to each other by a wire connecting material such as a connection board or a bus bar.

DESCRIPTION OF THE REFERENCE CHARACTERS

1: rotary electric machine, 2: stator, 3: rotor, 4: rotating shaft, 5: stator core, 6: magnetic tooth, 7, 7a, 7b, 7h, 7i: slot, 8, 8a, 8b, 8c: conductive wire, 10a, 10b, 10c, 10e, 10f: coil end (coil), 11, 11a, 11b, 11e, 11f: first jumper section, 12, 12a, 12e, 12f, 12g: second jumper section, 13a: first conductive wire portion, 13b: second conductive wire portion, 15a: contact portion (routing portion), 16: connection portion, 18: wire connecting material, 20: bobbin, 21a, 21b, 21c, 21d, 21k, 21l, 21m, 21n, 21p: erect portion, 32: second jumper section, 38: coil end, 41, 43: first jumper section, 42, 44, 47, 50: second jumper section, 46: power feeding section, 48, 52: wire connecting material, 56: twisted portion, 72 to 74: wire connecting material, 75a to 75c: second jumper section, 79: first jumper section, 80: first side of coil, 81: second side of coil

BEST MODE FOR CARRYING OUT THE INVENTION

Embodiment 1

Figure 1:
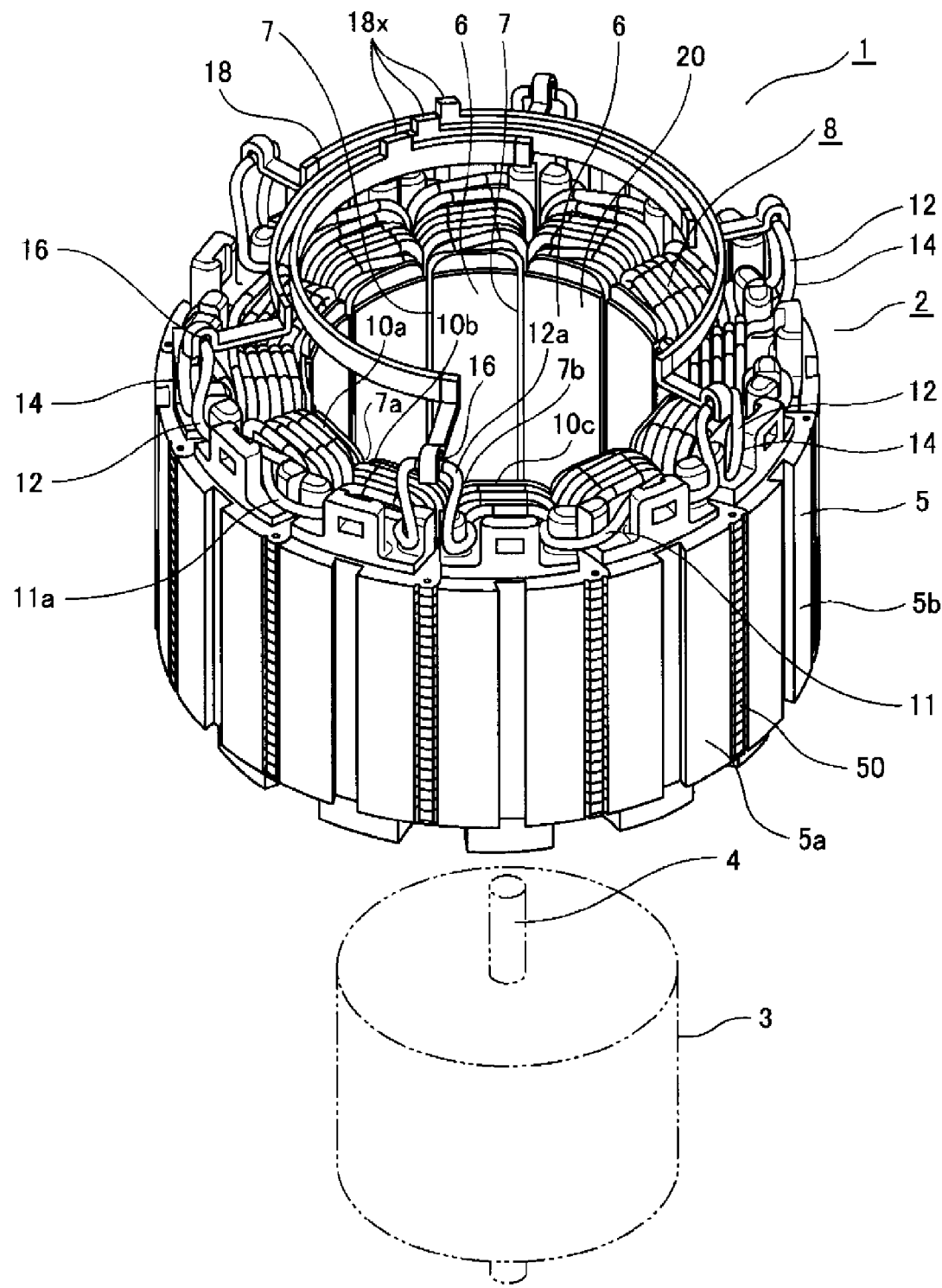
FIG. 1 is an overall view of a motor which is an example of a rotary electric machine according to Embodiment 1.
Figure 2:
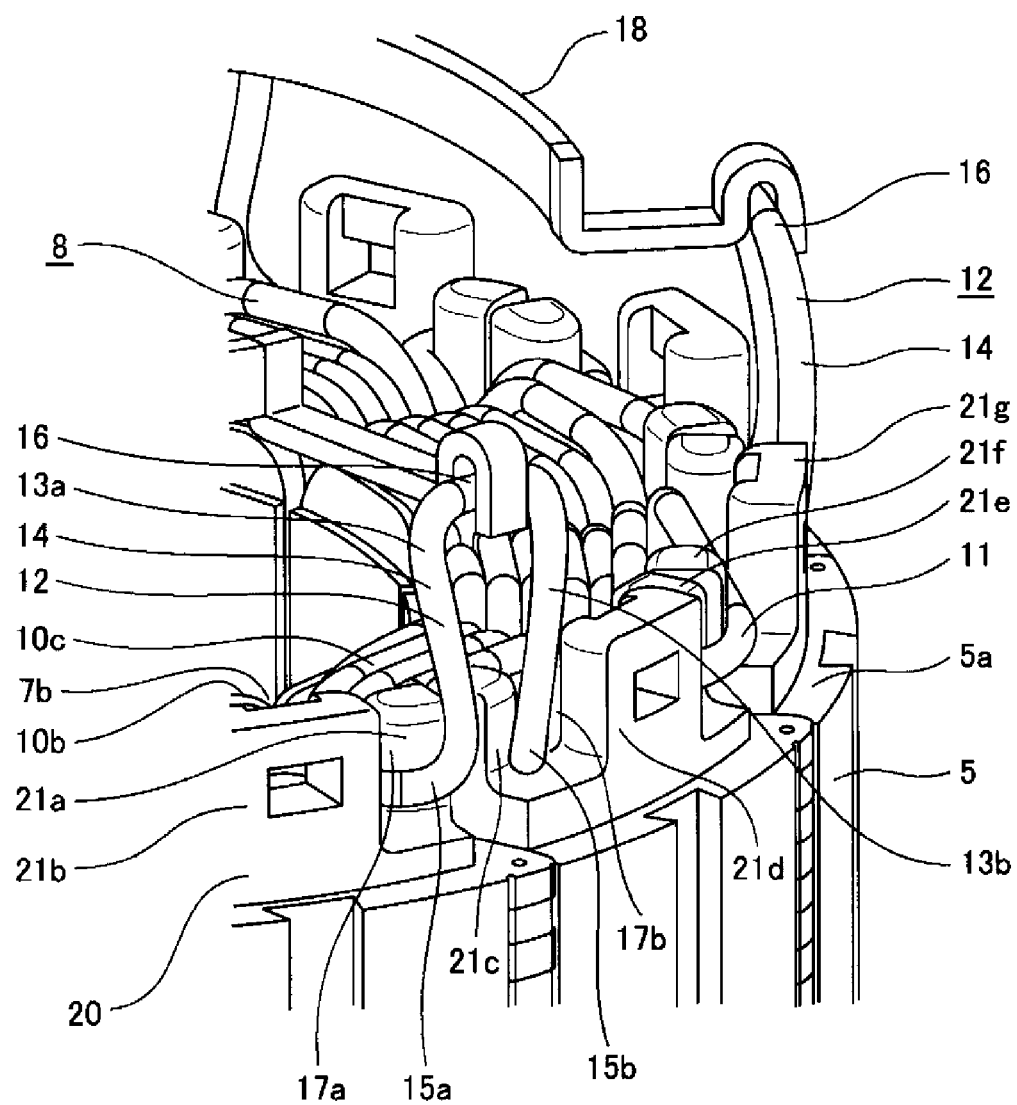
FIG. 2 is an enlarged view of a principal part of a stator in the motor illustrated in FIG. 1.
Figure 3:
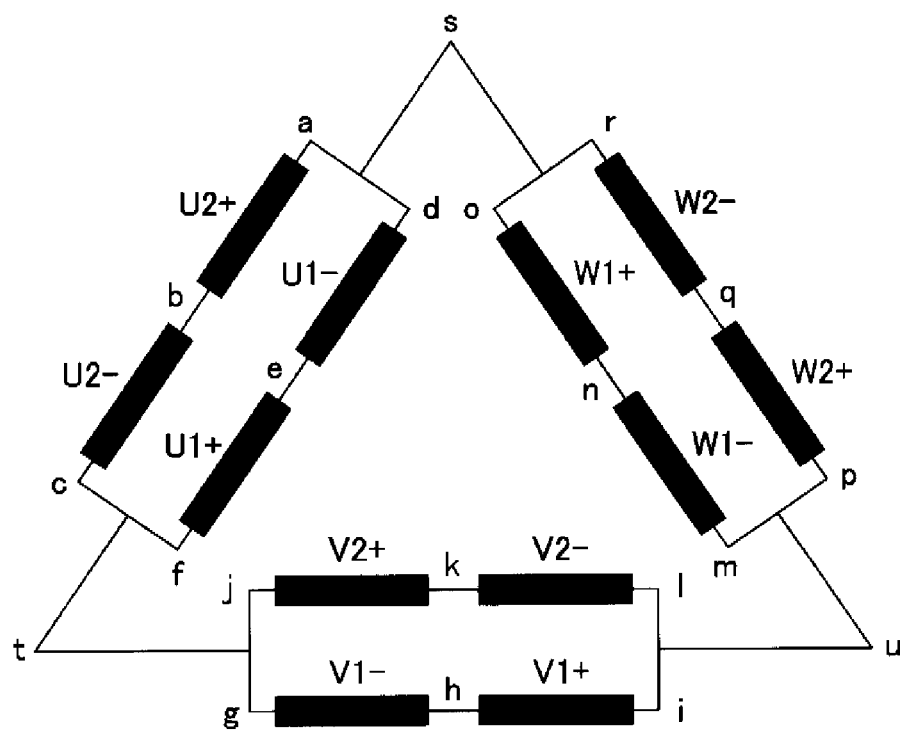
FIG. 3 is a diagram illustrating a wire connection of a conductive wire provided to the stator in the motor illustrated in FIG. 1.
Figure 4:
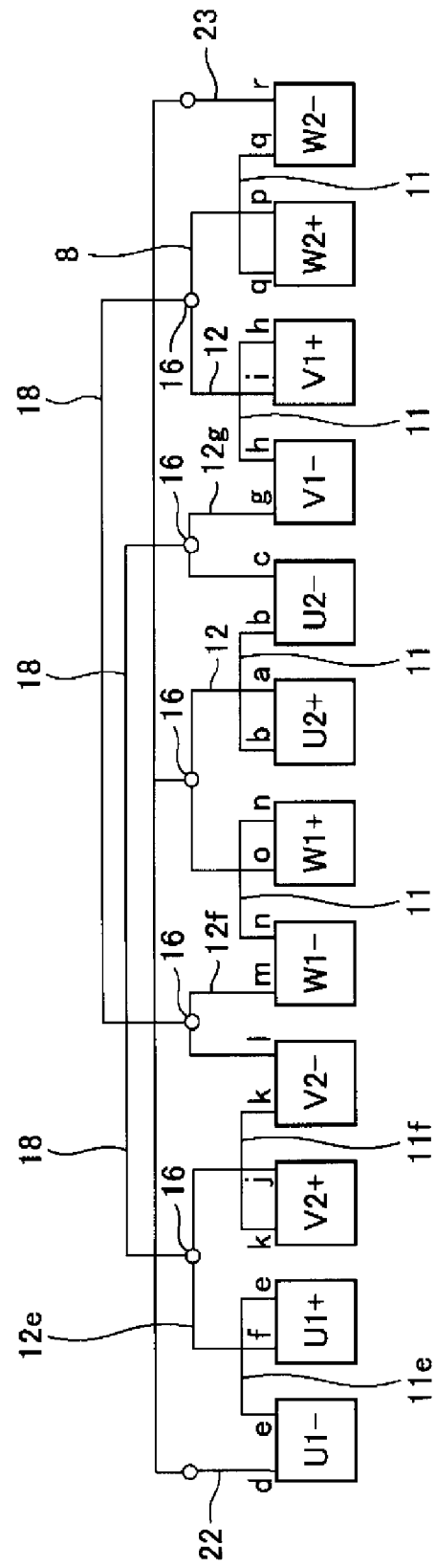
FIG. 4 is a diagram illustrating a wire connection specification of the conductive wire provided to the stator in the motor illustrated in FIG. 1.

Hereinafter, embodiments of the present invention will be described with reference to drawings. FIG. 1 is an overall view of a motor which is an example of a rotary electric machine according to Embodiment 1. FIG. 2 is an enlarged view of a principal part of a stator in the motor illustrated in FIG. 1. FIG. 3 is a diagram illustrating a wire connection of a conductive wire provided to the stator in the motor illustrated in FIG. 1, and FIG. 4 is a diagram illustrating a wire connection specification of the conductive wires provided to the stator in the motor illustrated in FIG. 1.

As best indicated in FIG. 1, a motor 1 which is a rotary electric machine according to this embodiment includes a stator 2 and a rotor 3. The rotor 3 is inserted inside the stator 2 and is rotatably fixed with a rotating shaft 4 in a motor 1. On the other hand, the stator 2 includes a stator core 5, and the stator core 5 includes a plurality (12 poles in this embodiment) of magnetic teeth 6. Slots 7 are formed between the respective adjacent magnetic teeth 6.

On the other hand, as will be described later with reference to FIG. 3, the plurality of magnetic teeth 6 are wound around continuously, i.e., seamlessly by a conductive wire 8 in this embodiment. The respective magnetic teeth 6 are intensively wound around by portions of the conductive wire 8 via bobbins 20, whereby coils 10a, 10b, 10c, and the like (12 in total) are obtained. In addition, the conductive wire 8 includes, as its portions, a plurality of first jumper sections 11 and a plurality of second jumper sections 12 which continuously connect the obtained coils. In FIG. 1, a first jumper section 11a, which is one of the first jumper sections 11, continuously, i.e., seamlessly connects the coils 10a and 10b. Further, a second jumper section 12a, which is one of the second jumper sections 12, continuously connects the coils 10b and 10c. Note that, each coil includes a portion that is accommodated in each slot 7 located on both sides of each magnetic tooth 6 and thus is hardly seen in FIG. 1, and coil ends which are located on both ends, in the direction along the rotating shaft 4, of each magnetic tooth 6. In FIG. 1, portions indicated by 10a to 10c form one of two coil-end groups which are located on both ends in the direction along the rotating shaft 4. The other coil-end group is on the lower side of the stator core 5 in FIGS. 1 and 2, and thus is not seen.

Each second jumper section 12 has a specific portion 14 which is formed by erecting a portion of the second jumper section toward the direction along the rotating shaft 4 of the rotor 3, and thus has a shape different from that of each first jumper section 11 which does not have such a portion.

In addition, each second jumper section 12 has a connection portion 16 that is linearly formed as compared to its adjacent portions. The connection portion 16 of the second jumper section 12 is gripped by a wire connecting material 18 which includes a power feeding section 18x. In this manner, the plurality of second jumper sections 12 are mutually connected by the wire connecting material 18.

That is, the rotary electric machine 1 according to this embodiment includes both the second jumper sections 12, which are connected to another jumper section by the wire connecting material 18, and the first jumper sections 11 which are not connected to another jumper section by the wire connecting material 18. Each first jumper section 11 and each second jumper section 12 have shapes different in height from each other, i.e., with respect to the height in the direction along the rotating shaft 4, the height being based on the coil ends 10a, 10b, 10c, and the like.

In other words, when a distance between an arbitrary portion of a first jumper section 11a and the coil end 10a or 10b neighboring the first jumper section 11a, and a distance between the connection portion 16 of a second jumper section 12a and the coil end 10b or 10c neighboring the second jumper section 12a are compared to each other, the latter is about two to five times longer than the former. This is because when the portions of the conductive wire 8 which are distanced from the coil ends 10a to 10c are compared to each other, the length of the second jumper section 12a is longer than the length of the first jumper section 11a.

Next, with reference to FIG. 2, the shape of the first jumper sections 11 and that of the second jumper sections 12 will be described in detail.

As illustrated in FIG. 2, bobbins 20 extend from the end surface 5a of the stator core 5. The bobbins 20 include pillar-shaped erect portions 21a and 21c and wall-like erect portions 21b and 21d which are all erect in the direction along the rotating shaft 4 of the rotor 3 (see FIG. 1, and the same is true hereinafter). As to a portion of the conductive wire 8 configuring a second jumper section 12, an end thereof extends from a slot 7b, and the conductive wire 8 passes through a gate portion 17a which forms a gate between the erect portion 21a and the erect portion 21b. When the conductive wire 8 passes through the gate portion 17a, a contact portion or a routing portion 15a of the conductive wire 8 partially comes in contact with either or both of the erect portions 21a and 21b, or is routed around the erect portion 21a or the erect portion 21b.

Moreover, a portion of the conductive wire 8 configuring a second jumper section 12 extends along the erect portion 21a in the direction along the rotating shaft 4 of the rotor 3 over the height of the erect portion 21a, the portion succeeding to the contact portion 15a or the routing portion 15a. More specifically, after the contact portion or the routing portion 15a, the conductive wire 8 extends from the erect portion 21a outwardly in the radial direction of the stator 2, and extends in the direction along the rotating shaft 4 in a manner as to be distanced from the coil ends 10b and 10c, while inclining, as if bowing, inwardly in the radial direction of the stator 3. In addition, the conductive wire 8 has, in its portion most distanced from the coil ends 10b and 10c, a substantially linear connection portion 16 which extends in the direction substantially the same as the rotation direction of the rotor 3. After the connection portion 16, the conductive wire 8 passes through again a gate portion 17b between the erect portion 21c and the erect portion 21d after inclining in the same manner as above. When passing through the gate portion 17b, the conductive wire 8 partially comes in contact with either or both of the erect portions 21b and 21c, or is routed around the erect portion 21c or erect portion 21d, in the contact portion or routing portion 15b. Thereafter, the conductive wire 8 is accommodated in the slot 7b in the same manner as the above-described end of the portion of the conductive wire 8.

Further, as to the portion of the conductive wire 8 configuring the second jumper section 12, if a sub-portion which is between the contact portion 15a and the connection portion 16 and which is erect in the direction along the rotating shaft 4 is regarded as a first conductive wire portion 13a, and a sub-portion which is between the contact portion 15b and the connection portion 16 and which is erect in the direction along the rotating shaft 4 is regarded as a second conductive wire portion 13b, then it can be said that the distance therebetween is shortened as they come closer to the coil ends 10b and 10c, and relatively widens as they are increasingly distanced from the coil ends 10b and 10c as compared to the case of being close to the coil ends 10b and 10c. In this manner, since such portions whose distance widens relatively as they are increasingly distanced from the coil ends 10b and 10c are provided, tools can be inserted therethrough easily.

On the other hand, as to a portion of the conductive wire 8 configuring a first jumper section 11 which does not have the connection portion 16, when passing through a gate portion between the erect portion 21d and an erect portion 21e, the conductive wire 8 is routed around the erect portion 21d or the erect portion 21e, or partially comes in contact with either or both of the erect portions 21d and 21e, in the same manner as the second jumper section 12. However, thereafter, the conductive wire 8 is routed around the erect portion 21e and an erect portion 21f, without extending over the height of the erect portions 21e and 21f in the direction along the rotating shaft 4, and reaches a gate portion between the erect portion 21f and an erect portion 21g.

In the direction along the rotating shaft 4, the ratio between the height of the erect portion 21a and the height of the second jumper section 12, the heights being based on an end surface of the bobbins 20, is substantially 1:3 in this embodiment. The present invention is not limited to this. The ratio may be, for example, 1:1.1 to 1:6. More preferably, the ratio may be about 1:1.3 to 1:4. When the height of the second jumper section 12 is significantly high as compared to the height of the erect portion 21a, the overall size of the apparatus increases, and in addition the conductive wire is wasted. On the other hand, when the height of the erect portion 21a is significantly low, space for tool insertion is narrowed.

As above described, the second jumper section 12 is formed different in shape and position from the first jumper section 11, in terms of the following portions of the second jumper section 12: a portion of the conductive wire 8 passing along the outer side of the erect portions 21a and 21b in the radial direction of the stator 2; a portion of the conductive wire 8 passing over the slot 7, or a portion of the conductive wire 8 passing over a connection portion between the core pieces 5a such as a hinge 50 to be described later; and the respective neighboring portions.

Next, with reference to FIG. 3 and FIG. 4, a winding specification of the conductive wire 8 wound around in the stator 2 will be described.

FIG. 3 is a diagram illustrating an example of a wire connection of the conductive wire 8 wound around the magnetic teeth 6 including 12 slots as illustrated in FIG. 1. The phases of coils are classified into a U-phase, a V-phase, and a W-phase for respectively corresponding coil groups. In the example illustrated in FIG. 3, the conductive wire 8 is, as a whole, in delta connection so as to correspond to the three-phase power supply, and in each phase, coil units each composed of serially connected coils are connected in what we call a "two-series two-parallel connection". That is, when the U-phase is focused on, a coil U1– and a coil U1+ are connected serially, and U2+ and U2– are connected serially. Further, these two series connections are connected in parallel to each other. Here, signs + and – are added to the respective coils so as to indicate that the directions in which the conductive wire 8 is wound around the magnetic teeth 6 are opposite between + and –.

FIG. 4 is a diagram illustrating the order of winding of the conductive wire 8 around the respective magnetic teeth 7 and wire connection between coils, which are employed when the coil connection diagram (hereinafter referred to as a wire connection specification) shown in FIG. 3 is realized.

In the case of applying the connection shown in FIG. 3, as shown in FIG. 4, the respective magnetic teeth can be continuously wound around by one conductive wire 8 from the beginning of winding 22 to the end of winding 23. That is, with the one conductive wire, winding is conducted in the following order: the beginning of winding 22, U1–, U1+, V2+, V2–, W1–, W1+, U2+, U2–, V1–, V1+, W2+, W2–, and the end of winding 23. This is realized by the following winding manner. For example, in FIG. 4, winding by the conductive wire 8 starts on a d-side of a magnetic tooth which is wound around to form the coil U1–. The conductive wire 8 is wound around the magnetic tooth anticlockwise for a predetermined number of times thereby to form the coil U1–, and exits to an e-side of the magnetic tooth. The conductive wire 8 having exited to the e-side of the magnetic tooth enters an e-side of an adjacent magnetic tooth which is to be wound around to form U1+. This time, the conductive wire 8 is wound therearound clockwise, contrary to the above, for a predetermined number of times thereby to form the coil U1+, and exits to an f-side of the magnetic tooth. Further, the conductive wire 8 having exited to the f-side enters a j-side of the adjacent magnetic tooth, around which V2+ is to be formed, and is wound therearound clockwise. The conductive wire 8 is wound around continuously until it exits to an r-side of W2–.

Spaces (e.g., spaces between U1– and U1+, and between U1+ and V2+) between the respective adjacent coils (e.g., U1–, U1+, and the like) in FIG. 4 correspond to the respective slots 7 in FIG. 1. In addition, in FIG. 4, portions continuously connecting the respective coils indicated by U1–, U1+, and the like correspond to the jumper sections (e.g., 11e, 11f, 12e, 12f, and the like).

However, the above successive winding from U1–, U1+, to W2– by using one conductive wire 8 cannot realize the wire connection diagram shown in FIG. 3. To realize the wire connection diagram shown in FIG. 3, some of the plurality of jumper sections need to be further connected by using a wire connecting material 18. Here, jumper sections which are connected by the wire connecting material 18 (the jumper sections making f-j, l-m, o-a, c-g, and i-p continuous connections in FIG. 4) correspond to the second jumper sections 12 described with reference to FIG. 1 and FIG. 2. White circles in FIG. 4 correspond to the connection portions 16 described with reference to FIG. 1 and FIG. 2. The second jumper sections (e.g., a second jumper section 12e which makes an f-j continuous connection, and a second jumper section 12g which makes a c-g continuous connection) are mutually connected, at the connection portions 16, by the wire connecting material 18. These connections are made by fusing, TIG welding, or the like, using a grip tool or a heat inputting tool.

In addition, in FIG. 4, such jumper sections (jumper sections which make e-e, k-k, n-n, b-b, h-h, and g-g continuous connections in FIG. 4) which are not connected by the connection section 18 correspond to the first jumper sections 11.

The inventors of the present invention paid attention to the fact that the jumper sections which continuously connect coils are classified into such jumper sections that are connected by the wire connecting material and such jumper sections that are not connected by the wire connecting material, and have made it possible to secure spaces for wire connection by varying the configurations of the respective types of jumper sections.

In addition, as illustrated in FIG. 1, in the motor 1 according to this embodiment, when a distance between an arbitrary portion of the first jumper section 11a and the coil end 10a or 10b neighboring the first jumper section 11a, and a distance between the connection portion 16 of the second jumper section 12a and the coil end 10b or 10c neighboring the second jumper section 12a are compared to each other, the latter is set longer. Alternatively, when lengths of portions of the conductive wire 8 which are distanced from the coil ends 10a to 10c are compared to each other, the length of the second jumper section 12a is set longer than the length of the first jumper section 11a. Accordingly, a workspace for wire connection can be secured, and the insulation quality of the coils can be improved.

Further, as compared to the jumper sections 12 which need to be connected to the wire connecting material 18, the height of the jumper sections 11 which do not need such connection is set lower in the direction along the rotating shaft 4, whereby it is possible to prevent tools from coming in contact with the conductive wire 8 around the connection portions 16. In addition, such prevention of contact allows protection of an insulation cover of the conductive wire. Moreover, as compared to the case where the length or height of all the jumper sections are set uniform, the entire length of the conductive wire 8 can be set shorter, and thus the amount of metal use can be reduced.

Further, since each connection portion 16 is linearly formed as compared to its neighboring portion of the conductive wire 8, the positional relation between the wire connecting material and the second jumper sections can be well secured. As a result, the accuracy in wire connection processing such as fusing is improved, and thus variation in resistance at wire connecting portions can be reduced.

Note that, in this embodiment, the linear portion is formed at a portion most distanced from the coil end in a manner as to be substantially parallel to the coil end. However, the present invention is not limited to this, but the linear portion may be located at any portion of each second jumper section. For example, either of the first conductive wire portion 13a or the second conductive wire portion 13b which are erect in the direction along the rotating shaft 4, as illustrated in FIG. 2, may be formed as the linear portion.

Further, the conductive wire 8 in this embodiment has the contact portion 15a which is a portion of the conductive wire 8 extending from the slot 7 and which comes in contact with at least either of the erect portion 21a or 21b. Alternatively, instead of the contact portion 15a, or in addition to the contact portion 15a, the conductive wire 8 has a routing portion 15a which is a portion of the conductive wire 8 extending from the slot 7 and which is routed around at least either of the erect portion 21a or 21b. Therefore, unwinding of the conductive wire 8 can be prevented.

Namely, the stator core 5 illustrated in FIG. 1 is configured of a plurality of core pieces 5a, 5b, and the like. Each of the core pieces 5a, 5b, and the like includes one magnetic tooth 6. In addition, the core pieces 5a and 5b, adjacent to each other, are mutually connected by the hinge portion 50. When the conductive wire 8 is wound around the respective magnetic teeth 6 via the bobbins 20, each of the core pieces 5a and 5b is held so as to be significantly warped by the hinge portion 50. In this manner, each of the core pieces 5a, 5b, and the like is warped by the hinge portion 50, and thus the slots 7 between the respectively adjacent magnetic teeth 6 are widened considerably, and a sufficient space for winding can be secured.

Note that a manner of winding is described in an unpublished Japanese application (application No. 2007-291874) filed by the inventors of the present invention. The Japanese application is incorporated herein by reference.

Upon completion of winding around a magnetic tooth 6 included in the core piece 5a, a second jumper section 12 is formed, and winding around another magnetic tooth 6 included in the core piece 5b is started. Upon completion of winding around the magnetic teeth, the angle of each hinge 50 is returned to the original state such that the stator 2 forms a cylindrical shape as illustrated in FIG. 1. In this manner, the stator core 5 includes the hinge portions 50, and thus when the angle of each hinge 50 is returned to the original state, there is a possibility that the coil wound around each magnetic tooth 6 will be unwound. In this embodiment, the conductive wire 8 is made contact with or routed around the erect portions (21a, 21b, and the like) of the bobbins 20, whereby unwinding can be prevented. The unwinding prevention is particularly required for the second jumper sections 12 which are erect and distanced from the erect portions (21a, 21b, and the like). Thus, in this embodiment, the contact portion or routing portion (15a) is arranged at a root portion of each second jumper section 12 from which the second jumper section extends in the rotating shaft direction.

Further, in this embodiment, a single wire of jumper section that continuously connects portions of the conductive wire 8 extending from adjacent two slots 7 is used as a first jumper section. That is, in FIG. 4, a slot between U1− and U1+, and a slot between U1+ and V2+ correspond to the adjacent two slots. Similarly, the slot between U1+ and V2+ and a slot between V2+ and V2− also correspond to the adjacent two slots. The jumper section (e.g., a jumper section between "e" and "e", or a jumper section between "k" and "k") that connects portions of the conductive wire 8 extending from adjacent two slots as described above is used as the first jumper section 11e or 11f.

On the other hand, in this embodiment, a single wire of jumper section that continuously connects portions of the conductive wire 8 extending from a single slot is used as the second jumper section. That is, in FIG. 4, the jumper section 12f is a single wire that connects portions of the conductive wire 8 extending from a single slot between V2− and W1−. Similarly, a jumper section 12g is also a single wire that continuously connects portions of the conductive wire 8 extending from a single slot between U2− and V1−. These jumper sections 12f and 12g are used as the second jumper sections.

Further, in this embodiment, also regarded as the second jumper section is such a single wire of jumper section that continuously connects portions of the conductive wire extending from two slots arranged with one slot sandwiched therebetween. That is, the slot between U1− and U1+, and the slot between V2+ and V2− correspond to two slots arranged with a slot between U1+ and V2+ sandwiched therebetween. A jumper section (jumper section between "f" and "j") that continuously connects portions of conductive wire 8 extending from the two slots is used as the second jumper section 12e.

In this embodiment, as shown in FIG. 1, each second jumper section 12 is formed at a position of its corresponding hinge 50 which corresponds to a boundary between the core pieces 5a and 5b. In the case of forming each second jumper section 12 at such a position, the shape of the jumper section should be as symmetrical as possible about the position of the corresponding hinge 50 in consideration of an opening-closing movement of the hinge 50, whereby a possibility of coil unwinding can be reduced. Particularly for the second jumper section which is distanced from the bobbin 20 and has a predetermined three-dimensional structure, unwinding needs to be cared.

Accordingly, as to the jumper section 11e in FIG. 4, when the position of the slot (the position of a hinge 50) between the coil U1− and the coil U1+ is regarded as a center, the length of a portion of the conductive wire 8 from "e" on the U1− side to the center is shorter than the length of a portion of the conductive wire 8 from "e" on the U1+ side to the center. Thus, the portions of the conductive wire 8 are asymmetrical about the hinge 50, which is the center of the slot between U1− and U1+.

On the other hand, as to the jumper sections 12e, 12f, 12g, and the like, the length of the respective portions of the conductive wire 8 is substantially symmetrical about the position of the hinge.

Therefore, when the jumper section 12e, 12f, or 12g is used as the second jumper section, the conductive wire 8 exhibits a high symmetric property, which is suitable for prevention of unwinding, as compared to a case where the jumper section 11e, 11f, or the like is used as the second jumper section. Particularly, in the case of employing the "two-series two-parallel circuit" as shown in FIG. 3, there is no need to use the jumper section like the jumper section 11e or 11f as the second jumper section. Therefore, the structure of the second jumper section according to the present invention is more preferably applicable to a circuit, like the "two-series two parallel circuit", in which a jumper section can be connected to at its symmetrical center in a portion of the conductive wire 8. In this embodiment, in consideration of the symmetric property of the individual jumper sections in the conductive wire 8, such a jumper section that is highly symmetric is used as the second jumper section, whereas such a jumper section that is less symmetric is used as the first jumper section, whereby unwinding is prevented effectively.

Note that, in this embodiment, description has been made, with reference to FIG. 3 and FIG. 4, on the example of winding using one conductive wire 8 from the beginning of winding 22 to the end of winding 23. However, the present invention is not limited to this. For example, one conductive wire 8 may be used for a configuration from "d" to "l" and another one conductive wire 8 may be used for a configuration from "m" to "c" in FIG. 4.

Further, in this embodiment, description has been made on the case where the wire connecting material 18 grips each second jumper section 12 toward the coil end 10 side (from the upper side toward the lower side in the drawings). However, the present invention is not limited to this, but can be applicable to a case where the wire connecting material 18 grips the second jumper section 12 from the coil end 10 side (from the lower side toward the upper side of the drawings) in the direction along the rotating shaft 4.

Further, in this embodiment, a single wire of jumper section that continuously connects portions of the conductive wire 8 extending from a single slot is used as a second jumper section. Still further, in this embodiment, a single wire of jumper section that continuously connects portions of the conductive wire extending from two slots arranged with one slot sandwiched therebetween is also used as a second jumper section. However, the present invention is not limited to these, but can be applicable to a case where only either of the aforementioned jumper sections is used as the second jumper section. The following case, for example, corresponds to such a configuration: a case where instead of using one conductive wire 8 from the beginning of winding to the end of winding, three conductive wires are used.

Further, in this embodiment, the case has been described where the height of a second jumper section 12 is set higher than the height of the erect portions 21a, 21b, and the like with respect to the direction along the rotating shaft 4, and the height of a first jumper section 11 is set lower than the height of the erect portions 21a, 21b, and the like. However, the present invention is not limited to this. Instead, the height of the first jumper section 11 may be set substantially the same as that of the erect portions 21a, 21b, and the like.

In addition, in this embodiment, description has been made on the so-called split-type magnetic core in which core pieces 5a are connected by hinges 50. However, the present invention is not limited to this, but may be applicable to a so-called integrated core in which a plurality of core pieces are formed integrally and connection portions among the respective core pieces 5a are continuously formed.

Embodiment 2

Next, with reference to FIG. 5, Embodiment 2 of the present invention will be described. Description will be made on only those components which are different from those of Embodiment 1, and description on such components that are the same as those of Embodiment 1 will be omitted.

Figure 5:
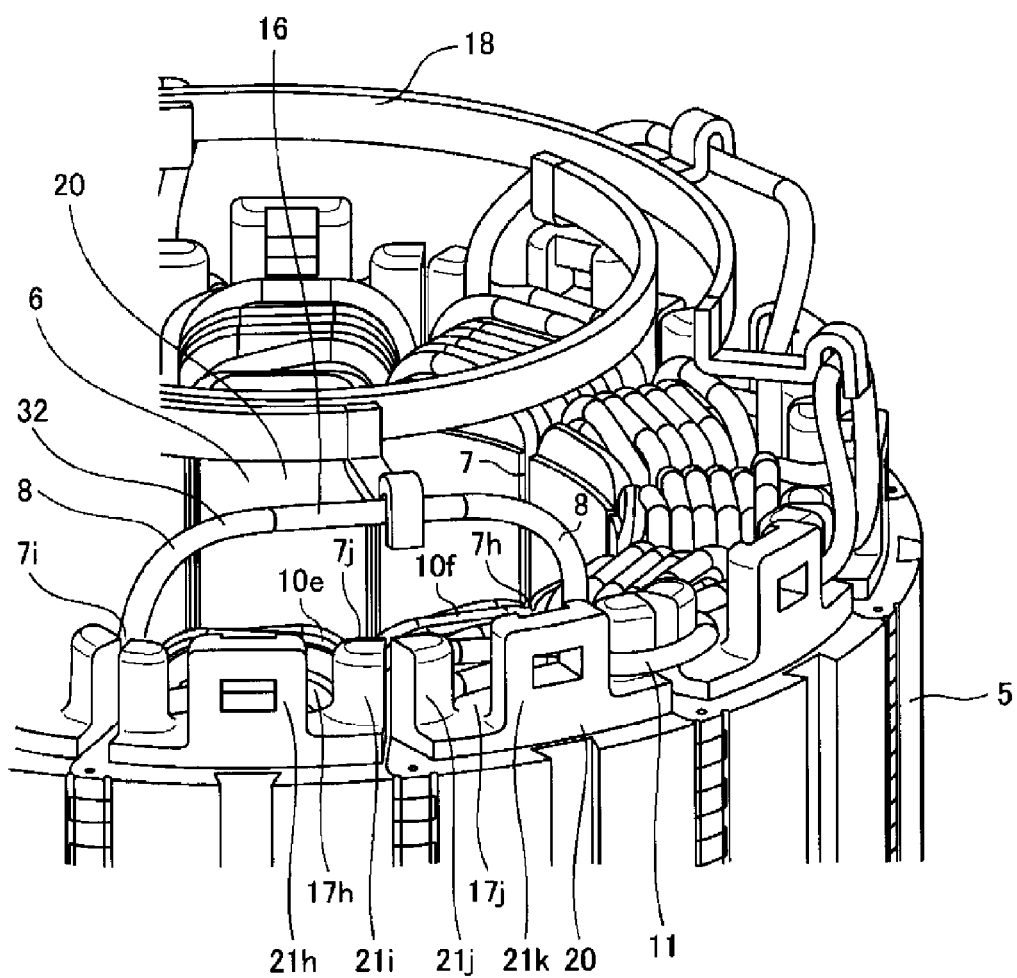
FIG. 5 is an enlarged view of a principal part of a stator in a motor according to Embodiment 2.

In FIG. 5, a second jumper section 32 has one end extending from a slot 7h and has the other end extending from a slot 7i. The slot 7h and slot 7i are two slots arranged with a slot 7j sandwiched therebetween. The second jumper section 32 continuously connects portions of the conductive wire 8 extending from the slots 7h and 7i. Such a second jumper section 32 corresponds to, for example, the jumper section 12e in FIG. 4 which connects "f" on the coil U1+ side and "j" on the coil V2+ side.

Further, a substantially entire portion of the second jumper section 32 according to this embodiment is distanced from coil ends 10e and 10f of two coils sandwiched between the two slots 7h and 7j. In this case, that is, the case where portions of the conductive wire 8 extending from the two slots 7h and 7i arranged with one slot 7j sandwiched therebetween are continuously connected, a jumper wire portion of Embodiment 1 would be configured as follows. That is, a portion of the conductive wire 8 configuring a second jumper section extends from the slot 7i, and is routed as if worming while partially coming in contact with the upper side of the coil end 10e. The conductive wire 8 routed on the coil 10e passes through a gate portion 17h between erect portions 21h and 21i, and forms the shape of the second jumper section described with reference to FIG. 1 and FIG. 2. Thereafter, the conductive wire 8 passes through a gate portion 17j between erect portions 21j and 21k. The conductive wire 8 having passed through the gate portion 17j is routed on a magnetic tooth 6 via the bobbin 20, and is accommodated to the slot 7h. Thereafter, the conductive wire 8 constitutes a coil end which is not shown in the drawing, passes through the slot 7j, constitutes the coil end 10f, and is again accommodated to the slot 7h. This is repeated. That is, the conductive wire 8 repeatedly constitutes the portion accommodated into the slot 7h, the coil end which is not shown in the drawing, the portion accommodated into the slot 7j, and the coil end 10f, thereby forming a coil. The coil end 10f also partially comes in contact with a portion of the conductive wire 8 routed on the magnetic tooth 6. As a result, in the case of the second jumper section according to Embodiment 1, the conductive wire 8 extending from the slot 7i comes in contact with the coil end 10e. In addition, the conductive wire 8 extending from the slot 7h also comes in contact with the coil end 10f.

On the other hand, as to the jumper section 32 according to Embodiment 2, the conductive wire 8 extending from the slot 7i extends in the longitudinal direction of the slot 7i (the direction along the rotating shaft 4) as shown in FIG. 5, and is distanced from the coil end 10e. Further, the conductive wire 8 extends substantially linearly in the direction substantially along the rotation direction of the rotor 3. Thereafter, the conductive wire 8 enters the slot 7h from the longitudinal direction of the slot 7h while being distanced from the coil end 10f. Thus, substantially the entire portion of the second jumper section 32 shown in FIG. 5, is distanced from the two coils sandwiched between the slots 7h and 7j, i.e., the coil ends 10e and 10f.

With this configuration, it is possible to secure a larger space for inserting tools for connection between the wire connecting material 18 and the second jumper section 32.

Embodiment 3

Figure 6:
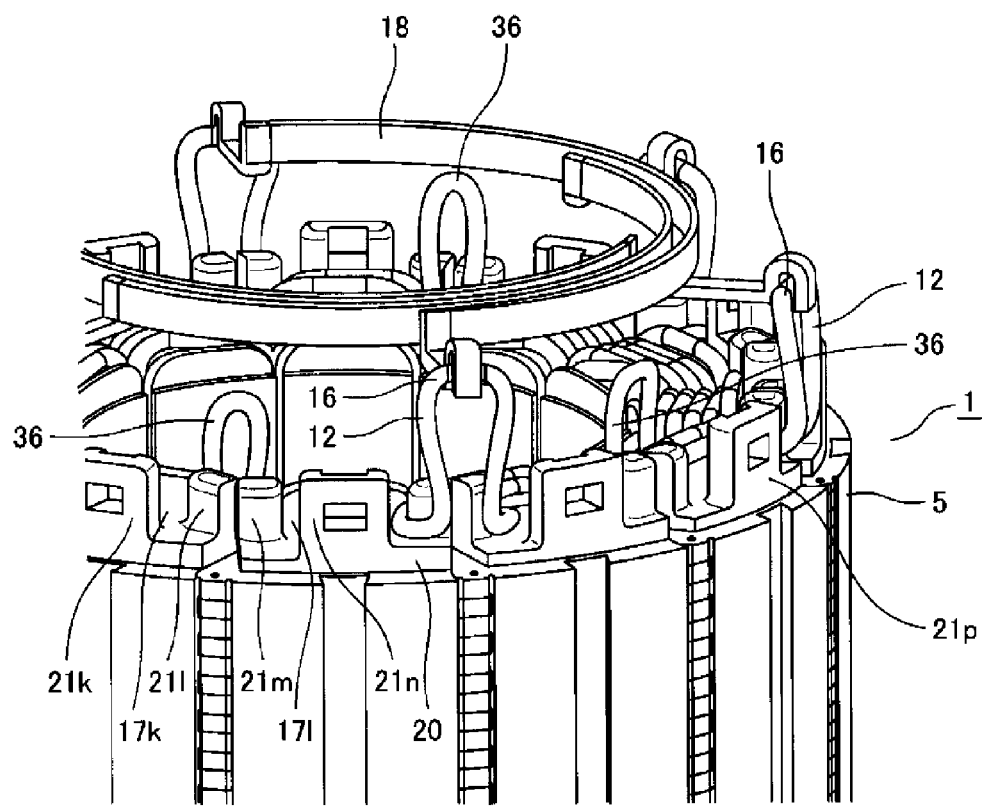
FIG. 6 is an enlarged view of a principal part of a motor according to Embodiment 3.

Next, with reference to FIG. 6, Embodiment 3 of the present invention will be described. FIG. 6 is a configuration diagram illustrating a principal part of a motor according to Embodiment 3 of the present invention. Note that only those components which are different from those of the above embodiments will be described, and description of those components which are the same as or correspond to those of the above embodiments will be omitted.

The motor according to this embodiment is configured such that a second jumper section 16 which includes a connection portion 16 gripped by the wire connecting material 18 is arranged in a manner as to be positionally displaced, with respect to the radial direction of the stator core 5 in the motor 1, from the first jumper section 36 which does not include the connection portion 16 and which is not gripped by the wire connecting material 18.

In this embodiment, the shape of the second jumper sections 12 is the same as the shape of the second jumper sections 12 according to the above embodiment described with reference to FIG. 1 and FIG. 2. On the other hand, the shape of the first jumper sections 36 according to this embodiment is different in several respects from the shape of the first jumper sections 11 according to the above embodiment described with reference to FIG. 1 and FIG. 2.

That is, a portion of the conductive wire 8 constituting a first jumper section 36 according to this embodiment does not pass through a gate portion 17k between the erect portions 21k and 21l of the bobbin 20. Similarly, the conductive wire 8 does not pass through a gate portion 17l between erect portions 21m and 21n, either. In this manner, the first jumper section 36 is located on the inner side of the erect portions 21k, 21l, 21m, and 21n of the bobbins 20 with respect to the radial direction of the rotary electric machine 1. On the other hand, at least a root portion of a second jumper section 12 is located on the outer side of the erect portion 21p or the like with respect to the radial direction of the rotary electric machine 1. In addition, the connection portion 16 is located at substantially the same position as the erect portion 21p with respect to the radial direction. Thus, the position of the first jumper sections 36 is different from that of the second jumper sections 12 with respect to the radial direction of the rotary electric machine 1. In this embodiment, the shapes of the bobbins provided to 12 magnetic cores are identical. The same is true for the above-described embodiments. However, in this embodiment, each first jumper section 36 does not come in contact with its corresponding erect portions of a bobbin, or is not routed around the contact portion. On the other hand, each second jumper section 12 comes in contact with its corresponding erect portions of a bobbin, or is routed around the erect portions in the same manner as those in the above embodiments. In this manner, jumper sections of one type each come in contact with the erect portions of the bobbin, whereas jumper sections of the other type do not come in contact with the erect portions. Accordingly, both types of jumper sections can be located at different positions. Thus, it is possible to secure spaces for wire connecting work. Note that, in this embodiment, the shape of the first jumper sections 36 is substantially the same as the shape of the second jumper sections 12. However, the present invention is not limited to this. Each first jumper section 36 may be routed substantially linearly from a slot to a slot without being distanced from its corresponding coil end in the direction along the rotating shaft 4. With this configuration, it is possible to avoid waste of the conductive wire. On the other hand, if both types of jumper sections have the same shape as in this embodiment, manufacturing operation can be eased advantageously.

Embodiment 4

Figure 7:
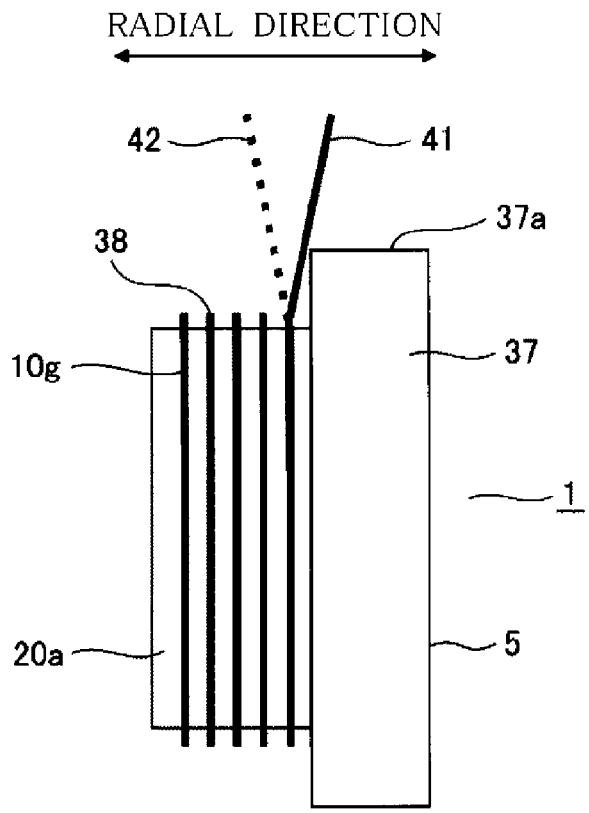
FIG. 7 is a lateral schematic view of a core piece 5.

Next, with reference to FIG. 7, Embodiment 4 of the present invention will be described. FIG. 7 is a lateral schematic view of a core piece 5. Note that only those components which are different from those of the above embodiments will be described, and description of the same or corresponding components will be omitted.

In FIG. 7, a coil 10g is wound around a core piece 5 via a bobbin 20a. The core piece 5 has a back yoke 37. In the above embodiments, an erect portion is provided on an upper end surface 37a of the back yoke 37. However, in this embodiment, the erect portion is omitted in the drawing.

In this embodiment, a first jumper section 41 and a second jumper section 42 are provided in a manner as to be positionally different from each other. Both the first jumper section 41 and the second jumper section 42 have their root portions located on a coil end 38 (or on a slot, the same is true hereinbelow), and are erect in the direction along the rotating shaft 4 of the rotor 3.

However, the first jumper section 41 is inclined outwardly in the radial direction of the rotary electric machine 1, whereas the second jumper section 42 is inclined inwardly in the radial direction.

In this manner, the first jumper section 41 is provided in a manner as to be positionally different from the second jumper section 42 with respect to the radial direction of the rotary electric machine 1, whereby the wire connecting material 18 can be downsized.

Note that in this embodiment, both the first jumper section 41 and the second jumper section 42 are erect from the coil end 38 toward the direction along the rotating shaft 4 of the rotor 3. However, the present invention is not limited to this. Instead, the jumper sections 41 and 42 may be provided in a manner as to be erect from the upper end surface 37a of the back yoke in the direction along the rotating shaft 4 and to be located in different positions with respect to the radial direction of the rotary electric machine 1.

Further, such a configuration may be also possible in which jumper sections of one type is provided on the coil end 36, and jumper sections of the other type is provided on the upper end surface 37a of the back yoke 37.

Embodiment 5

Figure 8:
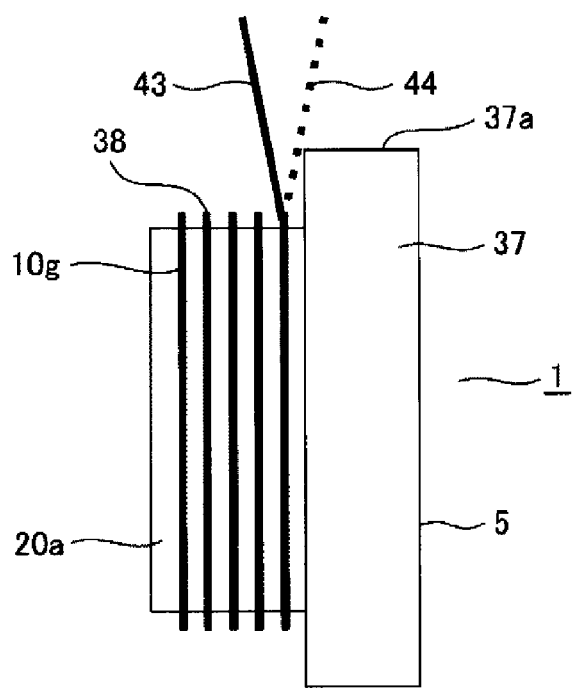
FIG. 8 is a lateral schematic view of the core piece 5.

Next, with reference to FIG. 8, Embodiment 5 of the present invention will be described. FIG. 8 is a lateral schematic view of a core piece 5. Note that only those components which are different from those of the above embodiments will be described, and description of the same or corresponding components will be omitted.

In this embodiment, contrary to above Embodiment 4, a first jumper section 43 is inclined inwardly in the radial direction of the rotary electric machine 1, whereas a second jumper section 44 is inclined outwardly in the radial direction. With this configuration, it is possible to secure a larger space for inserting tools from the outer circumferential side of the rotary electric machine 1.

Embodiment 6

Figure 9:
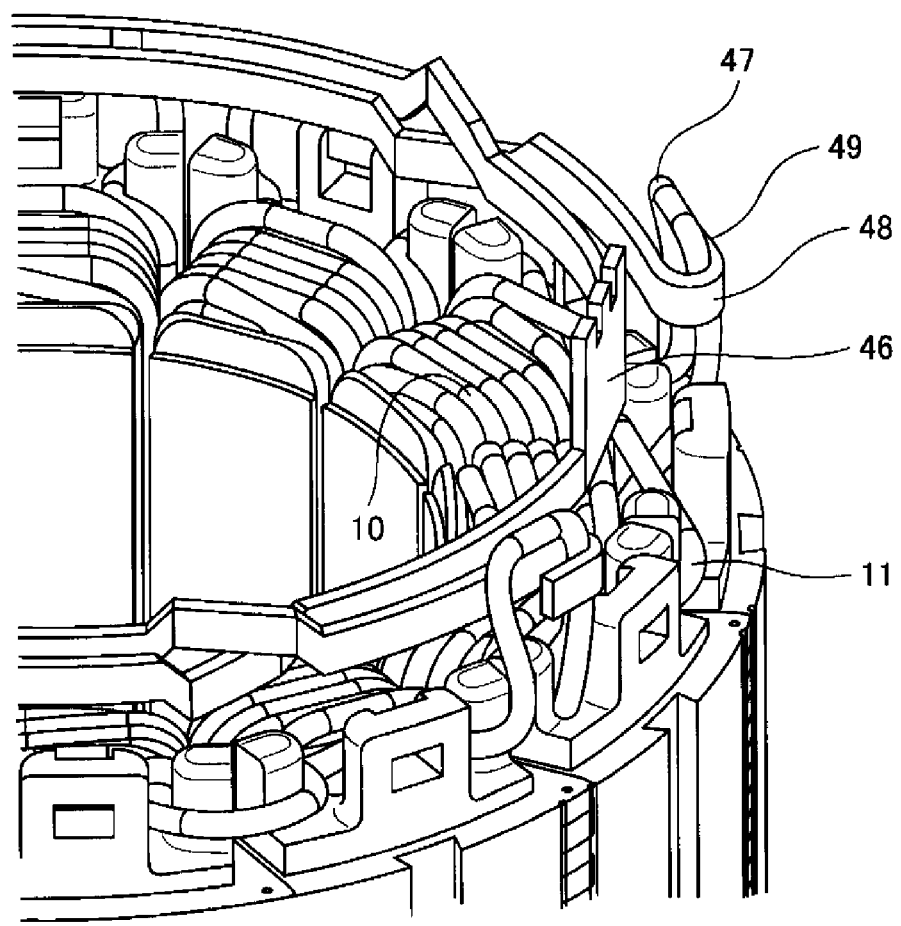
FIG. 9 is an enlarged view of a principal part of a stator in a motor according to Embodiment 6.

Next, with reference to FIG. 9, Embodiment 6 of the present invention will be described. FIG. 9 is an enlarged view of a principal part of a stator in a motor. Note that those components which are different from those of the above embodiments will be described, and description of the same or corresponding components will be omitted.

In the drawing, the shape and position of a second jumper section 47 are the same as those described in Embodiment 1. However, in Embodiment 1, a wire connecting material 48 grips the second jumper section 47 in the direction along the rotating shaft 4 of the rotor 3 toward the coil end or from the coil end. On the other hand, in this embodiment, the wire connecting material 48 including a power feeding section 46 grips the second jumper section 47 in a rotation direction of the rotor 3 (or including a direction opposite to the rotation direction when the rotor 3 rotates in only one direction) or in a lateral direction relative to the direction along the rotating shaft 4.

In the rotary electric machine according to this embodiment, the second jumper section 47 is configured to be higher than the first jumper section 11 with respect to the direction along the rotating shaft 4, the height being based on the coil end 10. Accordingly, even if the wire connecting material 48 is rotated, for example, in the rotation direction of the rotor 3 in order to fuse the wire connecting material 48 with the second jumper section 47, the first jumper section 11 does not hamper the fusing. Therefore, the wire connecting work between the second jumper section 47 and the wire connecting material 48 can be eased advantageously.

Embodiment 7

Figure 10:
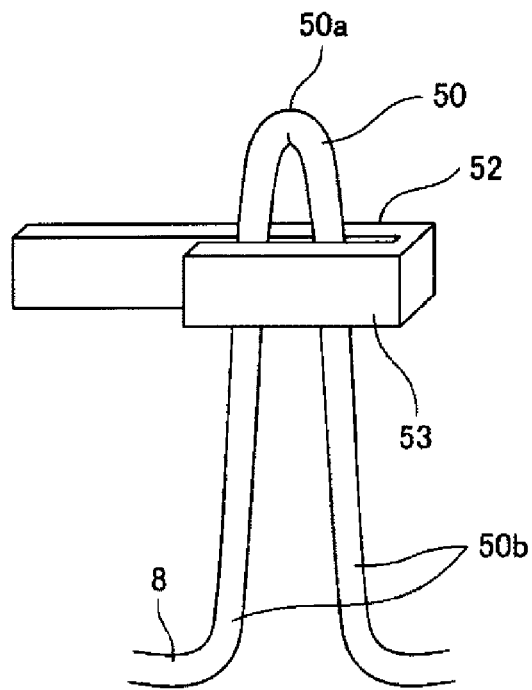
FIG. 10 is an enlarged view of a second jumper section according to Embodiment 7.

Next, with reference to FIG. 10, Embodiment 7 of the present invention will be described. FIG. 10 is an enlarged view of a second jumper section according to this Embodiment 7. Note that only those components which are different from those of the above embodiments will be described, and description of the same or corresponding components will be omitted.

As shown in the drawing, the second jumper section according to this embodiment is erect in the direction along the rotating shaft 4, and a tip portion 50a is tapered relative to or is substantially the same as a root portion 50b. The shape of the second jumper section is like the shape of a hairpin. In addition, a grip portion 53 of a wire connecting material 52 grips two points of the second jumper section 50 in the rotation direction of the rotor 3 or in a lateral direction relative to the direction along the rotating shaft 4. With the jumper section configured as above, it is possible to securely connect the wire connecting material 52 and the second jumper section 50. Moreover, the beginning of winding 22 and the end of winding 23 of the conductive wire 8 shown in FIG. 4 need to be connected to each other electrically. To connect the beginning of winding 22 and the end of winding 23, both the beginning of winding and end of winding may be aligned to be erect from a bobbin or from a coil end, and may be connected together by a wire connecting material in a manner similar to that shown in FIG. 10. With this configuration, the beginning of winding 22 can be connected to the end of winding 23 substantially in the same configuration as the connection of the second jumper section 50, which realizes easy manufacturing operation.

Embodiment 8

Figure 11:
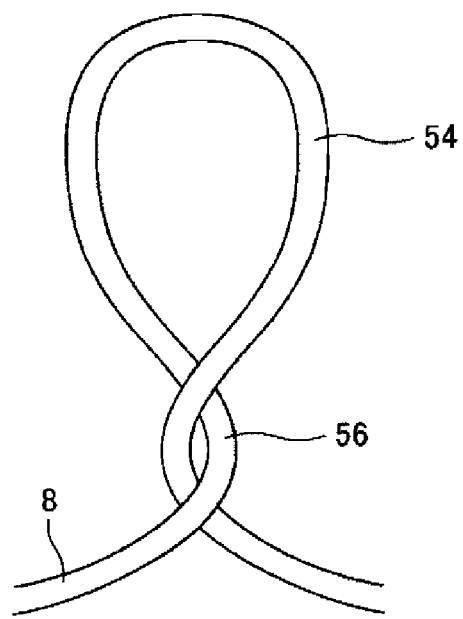
FIG. 11 is an enlarged view of a second jumper section according to Embodiment 8.

Next, with reference to FIG. 11, Embodiment 8 of the present invention will be described. FIG. 11 is an enlarged view of a second jumper section according to Embodiment 8. Note that only those components which are different from those of the above embodiments will be described, and description of the same or corresponding components will be omitted.

In this embodiment, a second jumper section 54 has a twisted portion 56 therein, which is obtained by twisting the conductive wire 8. With this configuration including the twisted portion 56, it is possible to prevent the conductive wire 8 from unwinding when a hinge 50 between a core piece 5a and a core piece 5b is moved.

Embodiment 9

Figure 12:
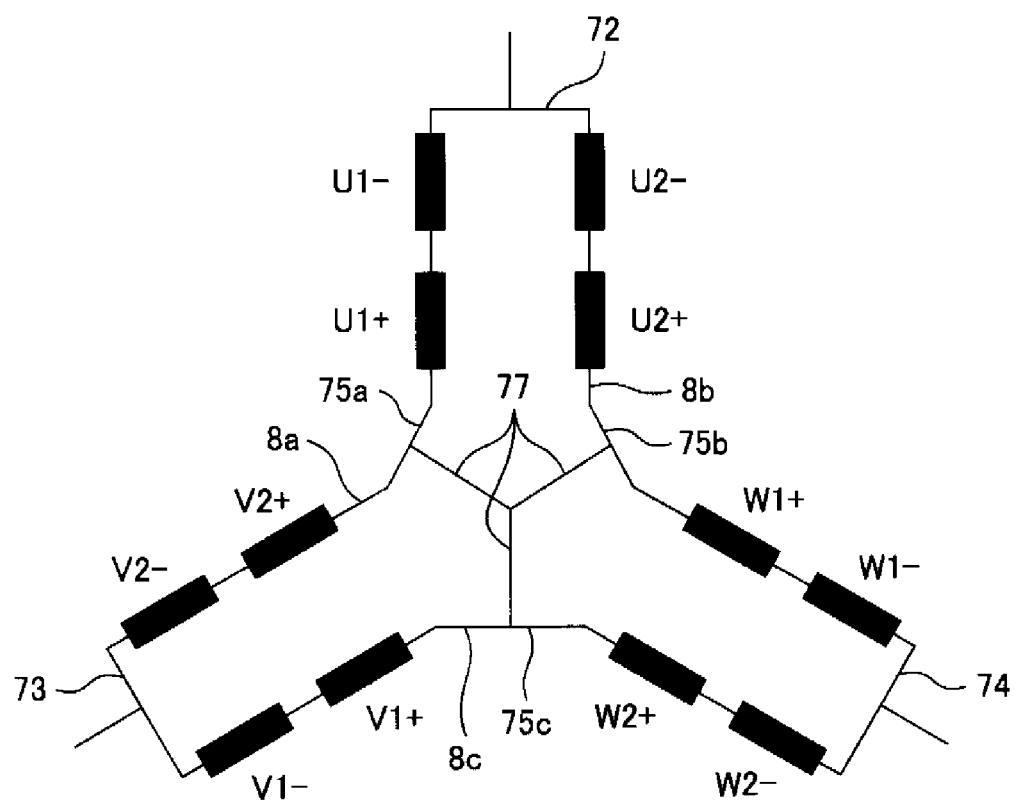
FIG. 12 is a diagram illustrating a wire connection of a conductive wire according to Embodiment 9.
Figure 13:
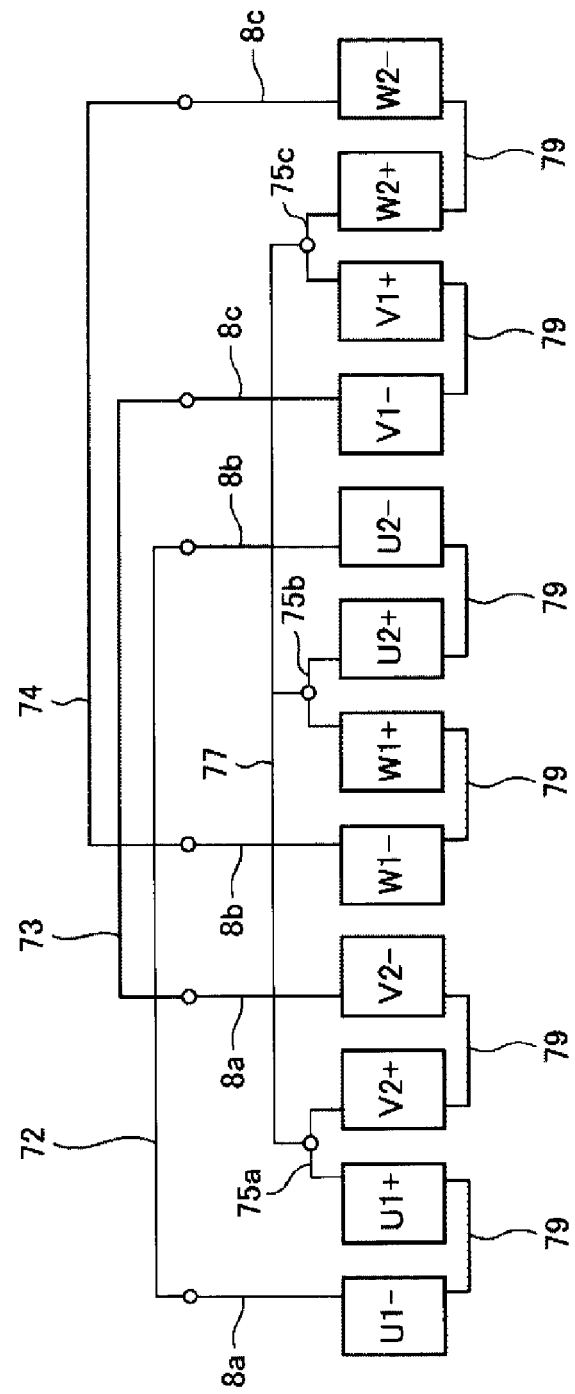
FIG. 13 is a diagram illustrating a wire connection specification of the conductive wire according to Embodiment 9.
Figure 14:
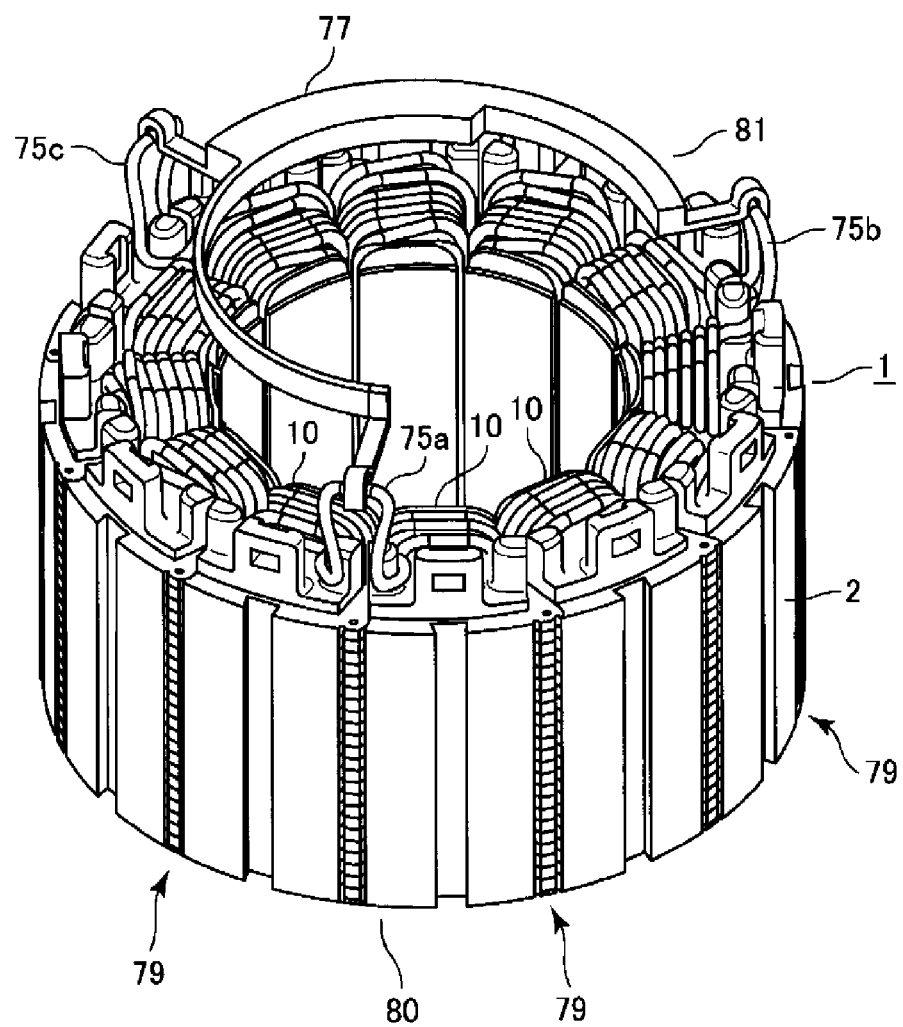
FIG. 14 is an overall view of a motor according to Embodiment 9.

Next, with reference to FIGS. 12 to 14, Embodiment 9 of the present invention will be described. FIG. 12 is a diagram illustrating a wire connection of a conductive wire according to this embodiment, and FIG. 13 is a diagram illustrating a wire connection specification of a conductive wire according to this embodiment. FIG. 14 is an overall view of a motor according to this embodiment.

Note that only those components which are different from those of the above embodiments will be described, and description of the same or corresponding components will be omitted.

First, with reference to FIG. 12 and FIG. 13, the winding specification of the conductive wire 8 according to this embodiment will be described. In above Embodiment 1, as described with reference to FIG. 4, one conductive wire is used for the configuration from the beginning of winding 22 to the end of winding 23. On the other hand, in this embodiment, three conductive wires are used for the overall connection. Note that both embodiments are the same in that the first and the second jumper sections are configured continuously with one conductive wire.

In this example, in response to a three-phase power supply, the conductive wire 8 is connected to form a star shape as a whole, and coils in each phase are connected serially to form two-coil units, and the coil units are connected in what we call the "two-series two-parallel connection". That is, in the case of a U-phase, coils U1− and U1+ are connected serially, and coils U2+ and U2− are connected serially. Further, these two coil units each connected serially are connected to each other in parallel. Here, signs + and − are added to the respective coils so as to indicate that the directions in which the conductive wire 8 is wound around the respective magnetic teeth 6 are opposite between + and −.

FIG. 13 is a diagram illustrating a winding order and a winding specification of realizing the wire connection diagram shown in FIG. 12.

In FIG. 13, to realize the wire connection shown in FIG. 12, the conductive wire 8 is wound around the stator in the following order. That is, firstly, by using one conductive wire 8a, coils are successively wound in order of U1−, U1+, V2+, and V2−. Further, by using one conductive wire 8b, coils are successively wound in order of W1−, W1+, U2+, and U2−. Similarly, by using one conductive wire 8c, coils are wound successively in order of V1−, V1+, W2+, and W2−.

Further, the end of the conductive wire 8a on the U1− side is connected to the end of the conductive wire 8b on the U2− side by a wire connecting material 72. Still further, the end of the conductive wire 8a on the V2− side is connected to the end of the conductive wire 8c on the V1− side by a wire connecting material 73. Similarly, the end of the conductive wire 8b on the W1− side is connected to the end of the conductive wire 8c on the W2− side by a wire connecting material 74.

In addition, a second jumper section 75a in the conductive wire 8a, a second jumper section 75b in the conductive wire 8b, and a second jumper section 75c in the conductive wire 8c are connected by a wire connecting material 77 to one another to form a neutral point. As is clear from FIG. 13, in the conductive wire 8a, two first jumper sections 79, which each are not connected to another jumper section by a wire connecting material, are formed: one being between U− and U1+, and the other being between V2+ and V2−.

Similarly, two first jumper sections 79 are provided in each of the conductive wires 8b and 8c.

FIG. 14 is an overall view of a motor according to this embodiment. As shown in FIG. 14, in a rotary electric machine 1 according to this embodiment, the first jumper sections 79 are arranged on a first side 80 only, and the second jumper sections 75a to 75c are arranged on the second side 81 only, the first side and the second side sandwiching the coils 10 therebetween. The shape of the first jumper sections 79 and that of the second jumper sections 75a to 75c are similar to those shown in FIG. 1 and FIG. 2. However, the present invention is not limited to this, but the shapes of the first jumper sections and the second jumper sections described in the other above-described embodiment may be also applied.

In FIG. 14, the wire connecting materials 72 to 74 illustrated in FIG. 13 are not shown. These wire connecting materials 72 to 74 may be arranged on the first side 80 of the rotary electric machine 1, or on the second side 81. However, in the case where the wire connecting materials 72 to 74 are arranged on the same side as the second jumper sections, all the connecting work can be done in a single direction, advantageously.

In this embodiment, as a result of the above-described configuration, the second jumper sections 75a to 75c can be separated from the first jumper sections 79. As a result, at the time of connecting the second jumper sections, tools therefor will not interfere with the first jumper sections 79. Thus, wire connection can be performed easily. In addition, the second jumper sections 75a to 75c are distanced from the first jumper sections 79 and the coils, and thus the possibility that the coils or the cover of the jumper wires are damaged by tool insertion will be reduced, which improves insulation quality.

The above respective embodiments can be employed in a mutually combined manner. In addition, individual configurations disclosed in the description of any one of the above embodiments can constitute an invention independently. For example, the configuration of the second jumper section can solely constitute an invention.

The invention claimed is:

1. A rotary electric machine comprising:
a wire connecting material used for wire connection;
a plurality of magnetic teeth;
first jumper sections which each are a portion of a conductive wire continuously wound around the plurality of magnetic teeth, and which each continuously connect coils that are formed of the conductive wire having been wound around the magnetic teeth, each of the first jumper sections not being connected to another jumper section by the wire connecting material; and
second jumper sections which each are a portion of the conductive wire continuously wound around the plurality of magnetic teeth, and which each continuously connect the coils that are formed of the conductive wire having been wound around the magnetic teeth, each of the second jumper sections being connected to another jumper section by the wire connecting material, each of the second jumper sections being different in shape and position from each of the first jumper sections;
wherein each of the coils has a coil end, and
with respect to a direction along a rotating shaft of a rotor which is fixed in the rotary electric machine, a height of each second jumper section based on the coil end is higher than a height of each first jumper section.

2. The rotary electric machine according to claim 1, further comprising:
bobbins each partially interposed between a corresponding one of the coils and a corresponding one of the magnetic teeth; and
erect portions which stand upwardly from the bobbins in a direction along a rotating shaft of a rotor rotatably fixed in the rotary electric machine, wherein
a height of each second jumper section is higher than a height of each erect portion with respect to the direction along the rotating shaft, and
a height of each first jumper section is substantially the same as or lower than a height of each erect portion with respect to the direction along the rotating shaft.

3. The rotary electric machine according to claim 1, wherein
each of the coils has a coil end,
each of the second jumper sections further includes a connection portion at which wire connection is made by the wire connecting material, and
a distance between the connection portion in each second jumper section and one of the coil ends neighboring the second jumper section is longer than a distance between an arbitrary point of one of the first jumper sections and one of the coil ends neighboring the first jumper section.

4. The rotary electric machine according to claim 1, wherein a length of each second jumper section is longer than a length of each first jumper section.

5. The rotary electric machine according to claim 1, wherein each of the second jumper sections includes a linear portion, as a connection portion connected by the wire connecting material.

6. The rotary electric machine according to claim 1, wherein
slots are formed among the respective magnetic teeth, the slots each accommodating one side of each coil,
the first jumper sections include a jumper section that is one wire continuously connecting portions of the conductive wire respectively extending from adjacent two of the slots, and
the second jumper section includes at least one of a jumper section that is one wire continuously connecting portions of the conductive wire extending from a single one of the slots, and a jumper section that is one wire continuously connecting portions of the conductive wire respectively extending from two of the slots arranged with one slot sandwiched therebetween.

7. The rotary electric machine according to claim 1, wherein each of the second jumper sections is arranged to be positionally different, with respect to the radial direction of the rotary electric machine, from each of the first jumper sections.

8. The rotary electric machine according to claim 1, wherein
each of the coils has a coil end, and the wire connecting material includes a grip portion for gripping each second jumper section toward the coil end or from the coil end.

9. The rotary electric machine according to claim 1, wherein
each of the second jumper sections stands upwardly in a direction along a rotating shaft of a rotor rotatably fixed in the rotary electric machine, and
the wire connecting material has a grip portion for gripping each second jumper section laterally relative to the direction along the rotating shaft.

10. The rotary electric machine according to claim 1, wherein
each of the second jumper sections stands upwardly in a direction along a rotating shaft of a rotor rotatably fixed in the rotary electric machine, and
the wire connecting material connects to two points of each second jumper section toward a rotation direction of the rotor or toward a direction opposite thereto.

11. The rotary electric machine according to claim 1, wherein the wire connecting material has a power feeding section for power supply.

12. The rotary electric machine according to claim 1, wherein the first jumper sections are arranged on a first side of the coils, and the second jumper sections are arranged on a second side of the coils.

13. The rotary electric machine according to claim 1, wherein,
each first jumper section and each second jumper section have root portions which stand from coil ends of their corresponding coils in a direction along a rotating shaft of the rotary electric machine and which are located at substantially the same area in a radial direction of the rotary electric machine,
each first jumper section is inclined outwardly in the radial direction, and
each second jumper section is inclined inwardly in the radial direction.

14. The rotary electric machine according to claim 1, wherein,
each first jumper section and each second jumper section have root portions which stand from coil ends of their corresponding coils in a direction along a rotating shaft of the rotary electric machine and which are located at substantially the same area in a radial direction of the rotary electric machine,
each first jumper section is inclined inwardly in the radial direction, and
each second jumper section is inclined outwardly in the radial direction.

15. A rotary electric machine comprising:
a plurality of magnetic teeth;
a wire connecting material used for wire connection;
slots formed among the magnetic teeth respectively adjacent to one another, the slots each accommodating one side of a coil;
bobbins each partially interposed between a corresponding one of the coils and a corresponding one of the magnetic teeth;
erect portions which stand upwardly from the corresponding bobbins in a direction along a rotating shaft of a rotor rotatably fixed in the rotary electric machine; and
jumper sections which each are a portion of a conductive wire continuously wound around the plurality of magnetic teeth, and which continuously connect the coils that are formed of the conductive wire having been wound around the magnetic teeth via portions of the bobbins, wherein
the jumper sections each include:
at least either of a contact portion which is a portion of the conductive wire extending from each slot and which comes in contact with the corresponding erect portions, and a routing portion which is a portion of the conductive wire extending from each slot and which is routed around the corresponding erect portions; and
a connection portion which extends from the contact portion or the routing portion in the direction along the rotating shaft and which is connected to the wire connecting material at a position distanced from a surface of the erect portions.

16. The rotary electric machine according to claim 15, wherein
each of the coils has a coil end, and
each of the jumper sections includes a linear portion which is connected to the wire connecting material at a position most distanced from the coil end of the coil in the direction along the rotating shaft.

17. The rotary electric machine according to claim 15, wherein
each of the coils has a coil end,
the conductive wire includes a first conductive wire portion and a second conductive wire portion which stand upwardly in the direction along the rotating shaft, and
a space between the first conductive wire portion and the second conductive wire portion is narrow at a position close to the coil end, and relatively widens with distance from the coil end as compared to the position close to the coil end.

18. The rotary electric machine according to claim 15, wherein each of the jumper sections continuously connects portions of the conductive wire extending from two slots arranged with one slot sandwiched therebetween, and substantially the entire length of the jumper section is distanced from coil ends of two coils sandwiched by the two slots.

19. The rotary electric machine according to claim 15, wherein each of the jumper sections has a substantially hairpin shape.

20. The rotary electric machine according to claim 15, wherein each of the jumper sections has a twisted portion where the conductive wire is twisted.

* * * * *